(12) United States Patent
Ruhstorfer et al.

(10) Patent No.: US 8,951,780 B2
(45) Date of Patent: Feb. 10, 2015

(54) METHOD AND DEVICE FOR PURIFYING NUCLEIC ACIDS

(75) Inventors: Maximilian Ruhstorfer, Luzern (CH); Bernd Buchberger, Zeitlarn (DE); Horst Donner, Penzberg (DE); Alois Rainer, München (DE)

(73) Assignee: Roche Molecular Systems, Inc., Pleasanton, CA (US)

( * ) Notice: Subject to any disclaimer, the term of this patent is extended or adjusted under 35 U.S.C. 154(b) by 0 days.

(21) Appl. No.: 12/261,476

(22) Filed: Oct. 30, 2008

(65) Prior Publication Data

US 2010/0256349 A1    Oct. 7, 2010

(30) Foreign Application Priority Data

Oct. 31, 2007   (EP) ..................................... 07021293

(51) Int. Cl.
*C12M 3/00*   (2006.01)
*B01L 3/00*   (2006.01)
*B01D 29/05*  (2006.01)

(52) U.S. Cl.
CPC ................. *B01L 3/508* (2013.01); *B01D 29/05* (2013.01); *B01L 3/502* (2013.01); *B01L 3/5021* (2013.01); *B01L 2200/0631* (2013.01); *B01L 2300/0681* (2013.01); *B01L 2300/069* (2013.01)
USPC .................................................... 435/287.2

(58) Field of Classification Search
CPC ............................ B01L 3/502; B01L 2200/025
USPC .......................... 435/287.2; 210/650; 422/101
See application file for complete search history.

(56) References Cited

U.S. PATENT DOCUMENTS

| 4,956,298 A | 9/1990 | Diekmann |
| 5,234,809 A | 8/1993 | Boom et al. |
| 5,601,711 A * | 2/1997 | Sklar et al. ..................... 210/238 |
| 5,783,686 A * | 7/1998 | Gonzalez ..................... 536/25.4 |
| 2006/0037903 A1* | 2/2006 | Smith et al. ................... 210/240 |

FOREIGN PATENT DOCUMENTS

| DE | 19512396 C1 | 7/1996 |
| DE | 19512361 A1 | 10/1996 |
| DE | 29803712 U1 | 6/1998 |
| DE | 10218554 A1 | 11/2003 |
| EP | 0616683 B1 | 4/1996 |
| EP | 0588564 B1 | 11/1996 |
| EP | 0897978 A2 | 2/1999 |
| EP | 0738733 B1 | 10/2001 |
| EP | 0897978 A3 | 10/2001 |
| EP | 0389063 B2 | 10/2006 |

(Continued)

OTHER PUBLICATIONS

Ausubel, F.M., et al., Current Protocols in Molecular Biology, John Wiley & Sons, 2.1.1-2.4.5 (1987).

(Continued)

*Primary Examiner* — Jonathan Hurst
(74) *Attorney, Agent, or Firm* — David J Chang

(57) ABSTRACT

The invention concerns a method for isolating and purifying nucleic acids from large sample volumes and a device suitable for this. The device comprises a funnel, a separating column, and a tab which are detachable from each other. The method according to the invention in which the device according to the invention is used ensures a higher yield of nucleic acids.

12 Claims, 20 Drawing Sheets

(56) References Cited

FOREIGN PATENT DOCUMENTS

| WO | WO93/11221 A1 | 6/1993 |
| WO | WO95/14708 A1 | 6/1995 |
| WO | WO96/41810 A1 | 12/1996 |
| WO | 97/21484 A1 | 6/1997 |
| WO | WO98/32877 A1 | 1/1998 |
| WO | WO2005/090567 A1 | 9/2005 |
| WO | WO2006/008085 A1 | 1/2006 |
| WO | 2008/006746 A3 | 1/2008 |

OTHER PUBLICATIONS

Miller, S.A., et al., Nucleic Acids Res. 16 (1988) 1215.
Sambrook, J. et al. Molecular Cloning, cold Spring Harbor Laboratory Press, 2nd Edition, 9.16-9.23, 1989.
Vogelstein, B. et al., Proc natl. Acad. Sci. USA 76; 615-619 (1979).

* cited by examiner

METHOD AND DEVICE FOR PURIFYING NUCLEIC ACIDS

RELATED APPLICATIONS

This application claims priority to EP 07021293.1 filed Oct. 31, 2007.

FIELD OF THE INVENTION

The invention concerns a method for isolating and purifying nucleic acids from a sample and a device suitable for this.

BACKGROUND OF THE INVENTION

The introduction of the polymerase chain reaction (PCR) and subsequent alternative amplification systems for nucleic acids has made it possible to use this genetic material as an examination material for diagnostic tests. This opens up new analytical opportunities especially for diagnosing hereditary diseases, predisposition for certain diseases and infectious diseases which among others also allow an early detection of the condition.

In order to convert the genetic material into a suitable form for enzymatic amplification, it is necessary to release it from the biological material. Furthermore, the nucleic acid must be protected from degradation by nucleases from the biological material or from the environment and also protected from degradation by chemical reaction conditions. The highest demands are made on the freedom from contamination of the biological sample and of the nucleic acid isolated therefrom. The nucleic acid should be present for the amplification in a buffered, aqueous, substantially salt-free solution.

Whereas very small amounts of analyte are basically used in PCR (pg-ng range), special problems require the processing of a larger amount of sample. In order to for example identify circulating tumour cells with a sensitivity of one tumour cell in a background of normal cells, the nucleic acid must for example be isolated from 10-20 ml of a blood sample. Then after homogenising the sample, an aliquot of the isolated RNA can be examined for the expression of a tumour-associated gene.

In addition to the classical methods of nucleic acid isolation by means of enzymatic, mechanical or chemical lysis of the sample material, subsequent extraction of the proteins and lipids by phenol and phenol/$CHCl_3$ and precipitation of the nucleic acid from the aqueous phase using ethanol or i-propanol (Sambrook, J., et al., Molecular Cloning, Cold Spring Harbor Laboratory Press, 1989, 2nd Edition, 9.16-9.23; Ausubel, F. M., et al., Current Protocols in Molecular Biology, John Wiley & Sons, 1987, 2.1.1-2.4.5), some commercial kits have been developed in recent years especially for PCR sample preparation which utilize the property of nucleic acids that has been known since the end of the seventies of binding under chaotropic salt conditions to glass surfaces (Vogelstein, B., et al., Proc. Natl. Acad. Sci. USA 76 (1979) 615-619). Other components of biological material such as proteins, lipids or salts are not bound and therefore separated. Centrifugation vessels with inserted glass fleeces or silica gel suspensions which allow a batch process are known. Furthermore multiple devices in a strip and 96-well microwell plate format with glass fleeces recessed into the bottom are known and can be operated with the aid of a vacuum chamber attached underneath as well as by centrifugation. In these methods the volume of the samples is often limited. Furthermore, large amounts of buffer are necessary for an effective elution of the nucleic acids from the glass fleeces which results in a diluted solution of the isolated molecules and requires additional preparation steps for certain applications.

A modified method (Miller et al., Nucl. Acids. Res. 16:1215) uses a concentrated salt solution to precipitate proteins and other accompanying substances after the sample material has been lysed. The nucleic acids located in the supernatant are then precipitated by ethanol and collected by centrifugation. After the nucleic acids have been dissolved they can be used for amplification.

WO 93/11221 discloses a method and a device for isolating and purifying nucleic acids which uses anion exchangers and mineral carrier substances. WO 98/32877 discloses a device for isolating nucleic acids which is composed of two vessels which are connected by a closure element in which a material for binding nucleic acids is introduced. U.S. Pat. No. 4,956, 298 discloses a separation or reaction column consisting of a centrifugation vessel and a receiving body wherein the receiving vessel contains a column material and the centrifugation vessel collects the discharge from the receiving body. DE 19512361 discloses a method for isolating a biological material which uses a compressible porous matrix for binding the biological material and uses the compression of the material to elute the material. EP 588564 describes a device for affinity separation comprising a capture membrane arranged in a pipette tip. WO 96/41810 discloses the withdrawal of DNA from a cell suspension with the aid of a hollow membrane filter and an ion exchange step. The production of a device containing a material for binding nucleic acids is known from EP 738733. The German utility model DE 298 03 712 U1 describes a device for treating biomolecules comprising a separation column which has a separating device and a collection vessel for the discharged liquid. In this device the funnel-shaped extended separating device also has (a) a volume for receiving a large amount of lysate and (b) a filter element (glass filter) which serves to adsorb nucleic acids from the lysate. In each centrifugation step the separating device is always used inserted into a centrifugation vessel. The centrifugation vessel is typically a 50 ml standard centrifuge vessel, for example a Falcon tube. A collecting vessel (microliter vessel) is plugged onto the bottom of the separating device in order to elute the adsorbed nucleic acids from the filter element. The separating device and attached collecting vessel are inserted into the centrifugation vessel whereby the collecting vessel touches the bottom of the centrifugation vessel. WO 2005/090567 describes a device consisting of a funnel element and a commercial spin column (also known as a "mini-spin column"; also referred to as a "separating column" in the following) with a glass fleece. An example of such a separating column is a HIGH PURE column (Roche Diagnostics Operations, Inc.). The funnel element has a volume for receiving a large amount of lysate. The bottom of the funnel element has an opening into which a spin column is inserted flush and sealed at the edge. This combination is inserted into a 50 ml standard centrifuge vessel for the first centrifugation step in which the centrifugal force presses the lysate through the glass fleece, the nucleic acids adsorb to the glass fleece and the discharge is collected in the centrifugation vessel. Subsequently the separating column can be removed from the funnel element and inserted into a microliter vessel in order to carry out further steps (e.g., washing steps, elution) with smaller centrifuges with a higher holding capacity and higher rotation speeds. Such a procedure can offer advantages with regard to processing speed and throughput. WO 2006/008085 shows an arrangement in which a separating column is plugged onto a funnel element without further attaching means.

SUMMARY OF THE INVENTION

The object of the present invention was to provide another device and another method for purifying or isolating nucleic acids from large sample volumes.

The object is achieved according to the invention by a device the individual components of which are shown in FIGS. 1-6. Furthermore, a method is provided in which the device according to the invention is used. The method according to the invention in which the device according to the invention is used ensures a higher yield of nucleic acids.

One subject matter of the present invention is a device for purifying or isolating nucleic acids consisting of a funnel (100), a separating column (200) and a tab (300), characterized in that the funnel, separating column and tab can be detached from one another, the separating column located at the inlet of the separating column rests flush and tight against the lower end of the shaft (B, 108) of the funnel so that the outlet of the funnel and the inlet of the separating column are functionally connected, wherein the tab supports the annular flange (203) of the separating column in that the inner edge (302, 303) of the tab extends under the annular flange and the outer edges (301) of the flange are held on both sides by a holder (C, 105) at the lower end of the shaft and wherein a nucleic acid-binding material (204) is located in front of the outlet opening (205) of the separating column.

A further aspect of the invention concerns a vessel (800) which contains a device according to the invention.

The invention also concerns a method for purifying or isolating nucleic acids from a sample comprising the steps:
a) providing a device according to the invention,
b) transferring the sample into the device through the inlet opening in the first funnel,
c) passage of the sample from the separating column through the nucleic acid-binding material into a vessel in the process of which the nucleic acids bind to the nucleic acid-binding material,
d) optionally washing the nucleic acids bound to the nucleic acid-binding material,
e) detaching the tab, separating the tab, separating column and funnel and transferring the separating column into a collecting vessel (700),
f) washing the nucleic acids bound to the nucleic acid-binding material,
g) eluting the nucleic acids bound to the nucleic acid-binding material and collecting the nucleic acids in a second collecting vessel (700) which are thus purified or isolated.

The invention also concerns a kit for purifying or isolating nucleic acids from a sample which is composed of a device according to the invention or a vessel according to the invention and chaotropic reagents for binding the nucleic acids to the nucleic acid-binding material.

A further subject matter of the invention is the use of a device according to the invention or of a vessel according to the invention to purify or isolate nucleic acids from a sample.

A nucleic acid-binding material is understood as a material to which nucleic acids bind non-covalently under certain conditions whereas other substances in a sample do not bind under these conditions. This binding of nucleic acids is reversible so that the nucleic acids can be subsequently eluted again from the material by changing the conditions.

A matrix is understood within the scope of this invention as a material in which particles or fibres of the nucleic acid-binding material are embedded. The matrix material is permeable to liquids so that the sample can pass through the matrix, the nucleic acids can come into contact with the nucleic acid-binding material and other components of the sample leave the matrix again. Solid materials having a small diameter are referred to as particles by a person skilled in the art. These particles preferably have an essentially spherical surface. Disk-shaped and fibre-shaped particles of the nucleic acid-binding material are referred to as fibres.

The funnel and separating column of the device according to the invention are hollow bodies. A hollow body within the scope of this invention is a hollow structure with an inlet opening through which a sample can enter the hollow body and an outlet through which the sample can leave the hollow body again. In contrast a vessel is a hollow structure with only one inlet opening through which a sample can enter the vessel. It can therefore be used to collect a sample.

The functional connection of hollow bodies is understood within the scope of this invention to mean that the two hollow bodies are connected in such a manner that the method according to the present invention can be carried out. For this purpose it should be possible to disconnect the connection as required, the connection should be impermeable to liquids and, for certain applications, it should also prevent air exchange with the environment. Furthermore, it should ensure that none of the sample is lost when it passes from the funnel into the separating column.

Chaotropic reagents are understood as substances which change the secondary, tertiary and/or quarternary structure of proteins or nucleic acids but do not affect at least the primary structure. Examples are, e.g., guanidinium thiocyanate, guanidinium hydrochloride, NaI, KI, sodium thiocyanate or combinations of these substances. Within the scope of this invention chaotropic reagents are understood as all chemical substances which interfere with the ordered structure of liquid water and thus have the effect that DNA or RNA from these aqueous solutions binds to a glass surface. Other substances such as NaCl, KCl or $CaCl_2$ may be present in the solution in order to modify the ionic strength. The property of DNA and RNA to bind to glass surfaces under chaotropic conditions can be used to isolate them from a solution containing other biological materials because the binding to the glass surface is reversible. If the concentration of the chaotropic reagents is for example reduced or if the chaotropic reagents are completely removed, the DNA or RNA can be eluted again.

DETAILED DESCRIPTION OF THE INVENTION

Figure 1:
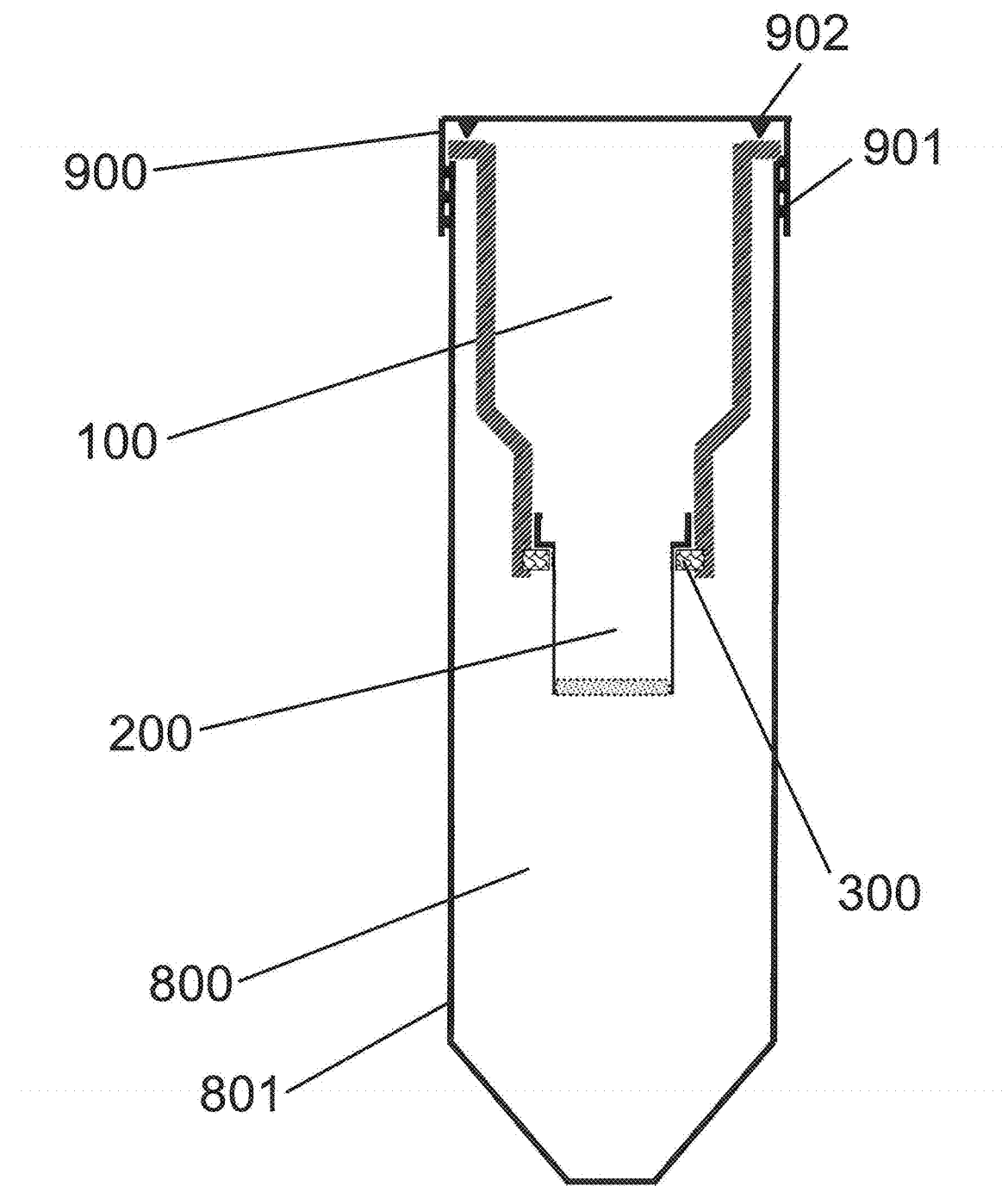
FIG. 1: Schematic representation of the device according to the invention in a vessel shown as an example. The device according to the invention consists of three separate elements that can be separated from one another: funnel (100), separating column (200) and tab (300), where in this case the arms of the tab are shown in cross-section. The vessel (800) with a vessel wall (801) which preferably has a round cross-section. The closure (900) is preferably a screw cap (901) and has fixing means (902) with which the funnel rim is pressed onto the rim of the vessel opening in the closed state.

The subject matter of the present invention is a device for purifying or isolating nucleic acids consisting of a funnel (100), a separating column (200) and a tab (300), characterized in that the funnel, separating column and tab can be detached from one another, the separating column located at the inlet of the separating column rests flush and tight against the lower end of the shaft (B, 108) of the funnel so that the outlet of the funnel and the inlet of the separating column are functionally connected, wherein the tab supports the annular flange (203) of the separating column in that the inner edge (302, 303) of the tab extends under the annular flange and the outer edges (301) of the flange are held on both sides by a holder (C, 105) at the lower end of the shaft and wherein a nucleic acid-binding material 204 is located in front of the outlet opening 205 of the separating column.

Materials that bind nucleic acids are known to a person skilled in the art. The material can be particulate as well as fibrous. If the material consists of particles it has proven to be advantageous to immobilize these particles, e.g., by positioning them between small liquid-permeable plates, e.g., fabrics or fleeces of fibrous material such as cellulose or plastics which have such narrow pores that the particles are retained between the small plates. The nucleic acid-binding material preferably mainly consists of silicon dioxide or contains silicon dioxide in the form of fibres or particles. The nucleic acid-binding material is preferably a glass fleece or a silica gel or consists of zeolite. The nucleic acid-binding material also preferably consists of metal oxides or metal mixed oxides or contains metal oxides or metal mixed oxides in the form of fibres or particles. The nucleic acid-binding material particularly preferably consists of aluminium oxide, hafnium oxide or zirconium oxide or contains aluminium oxide, hafnium oxide or zirconium oxide in the form of fibres or particles.

The nucleic acid-binding material is preferably a fibrous material, e.g., in the form of fabrics or fleeces. Suitable materials are for example known from methods for isolating nucleic acids with the aid of centrifugation tubes (EP 738733) or multiple devices in a strip format (EP 0616638). The nucleic acid-binding material must have the property that the sample liquid can pass through the material without an additional application of force or with the application of force, e.g., by exerting pressure or negative pressure. However, since in the present method the nucleic acids are not bound by filtering the nucleic acids from the sample but rather by a method in which the affinity of nucleic acids for surfaces is utilized, it is possible to use a relatively coarsely porous material. This facilitates the through-flow of even relatively viscous sample liquids.

The liquid-permeable, nucleic acid-binding material is able to bind nucleic acids, but allows the surrounding liquid and other components that are dissolved therein such as proteins etc. to pass through. In a first method the nucleic acids can be bound sequence-specifically by capture probes attached to the surface of the material. The capture probes have a base sequence which can bind under hybridization conditions to a complementary base sequence in the nucleic acids to be isolated. The use of sequence-specific materials allows the selective isolation of nucleic acids of a certain sequence. A method for binding nucleic acids to peptidic nucleic acids on the surface of solids is described for example in WO 95/14708.

Zirconium oxide, hafnium oxide or aluminium oxide (EP 897978) and also titanium oxide are suitable as a nucleic acid-binding material. The hydrogenated surfaces of these materials have sufficient positive charges to bind negatively charged nucleic acids. The hydration of the surface of the oxides can take place in basic solutions. The nucleic acids can then be subsequently eluted by washing with low-molecular alcohols or other washing solutions with a low pH.

In a preferred case the liquid-permeable, nucleic acid-binding material has a glass-containing surface. The property of glass in a particulate and fibrous form to bind nucleic acids has been known for a long time. Chaotropic reagents such as guanidinium thiocyanate, guanidinium hydrochloride, NaI, KI, sodium thiocyanate or combinations of these substances are necessary for the reversible binding to the glass surface (U.S. Pat. No. 5,234,809). The use of glass fleeces for isolating nucleic acids is described in DE-A-19512369. A method is proposed in EP-B-0389 063 in which the sample is mixed with a mixture of a chaotropic guanidinium salt and silica particles. Under these conditions nucleic acids bind sequence-independently to the silica surface. The other sample components can be washed away and the nucleic acids can be subsequently eluted in an aqueous buffer.

Nucleic acids in the sense of the invention are understood as nucleic acids of any origin, e.g., nucleic acids of viroidal, viral, bacterial or cellular origin. If the nucleic acids are not freely accessible in the sample, they are preferably made available using appropriate reagents. These include changes in the pH (alkaline), heat, repetition of extreme temperature changes (freezing/thawing), changes in the physiological growth conditions (osmotic pressure), action of detergents, chaotropic salts or enzymes (e.g., proteases and lipases). Sample materials from which nucleic acids can be released in this manner are in particular cell-containing media, cell smears and tissue sections. The nucleic acids can be RNA as well as DNA.

The device according to the invention comprises two hollow bodies, a funnel and a separating column (100/200). The funnel consists of three parts A, B and C (see FIG. 2). A refers to the upper part which comprises the largest volume of the funnel. The upper end of the funnel wall (101) adjoins an annular flange (102) which projects outwards and surrounds the inlet opening of the funnel. The funnel tapers (103) towards the shaft. Part B of the funnel comprises the shaft (108) which is functionally connected to the separating column (200). The part C comprises a holder (105) for the tab (300).

Figure 4A:
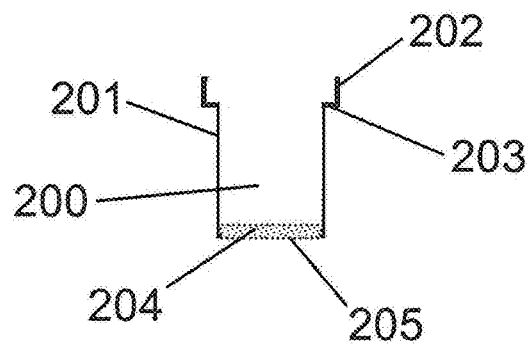
FIG. 4: (a) Schematic representation of the separating column, (b) Schematic representation of a first preferred embodiment of the tab (300) in which the tab is shaped as a small plate (top-view shown) with a concavity (inner edges of the concavity (303) and (302)) and two opposing arms. The outer edge that comes into contact with the grooves (107) of the holding device (105) in the assembled device is denoted (301). (c) Schematic representation of a further particularly preferred embodiment of the tab (300) with a predetermined breaking point (304).
Figure 5A:
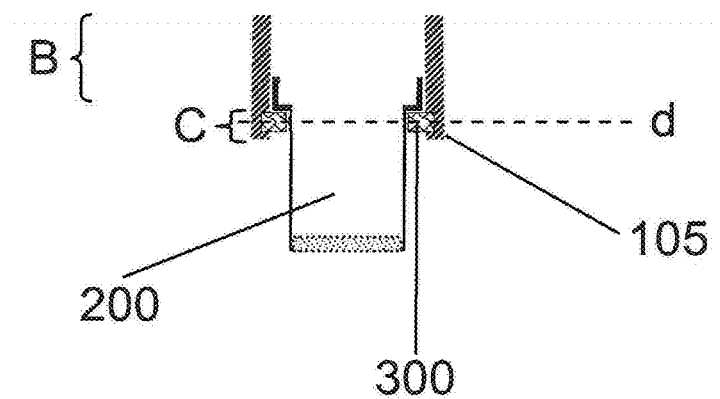
FIG. 5: Three preferred embodiments of the funnel shaft for making a functional connection between the funnel and separating column (schematic).
Figure 5B:
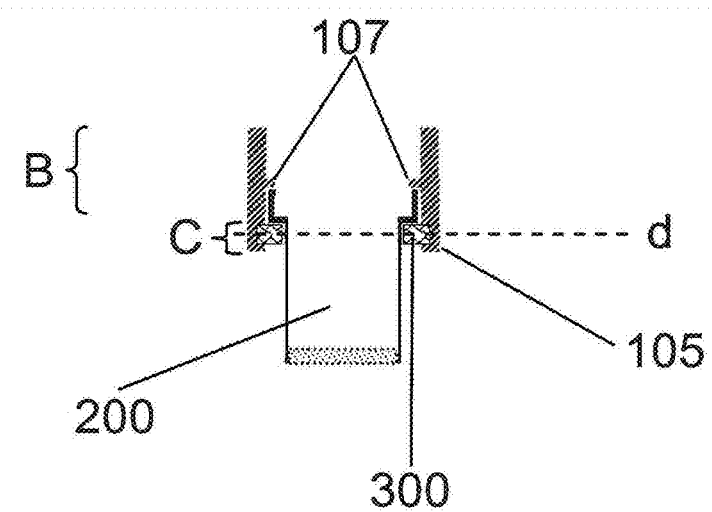
Figure 5C:
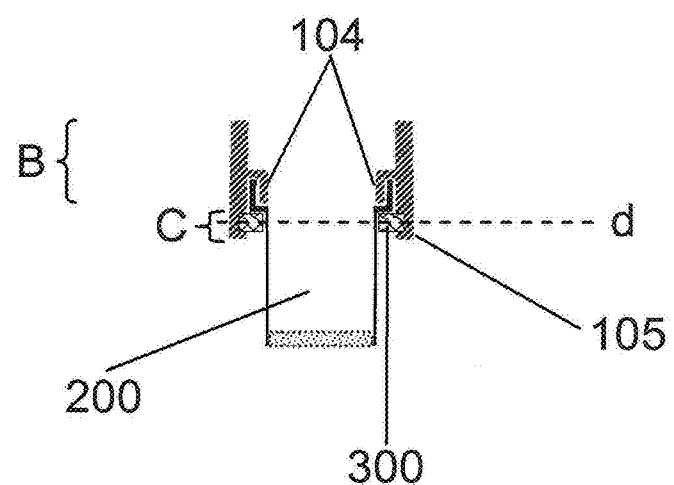

The funnel and separating column are connected by a functional connection. The inlet opening of the separating column is connected to the outlet opening of the funnel at the shaft (B; 108) of the funnel. As shown in FIGS. 5a-c, the annular flange of the separating column (see 202, see FIG. 4a) rests flush and tight against the inner wall of the funnel shaft (B; 108). In this connection the upper edge of the annular flange can abut against a bead (107) fixed to the inner wall of the funnel shaft. A plug connection shown in FIG. 5c is also possible and particularly preferred. In this case the annular flange plugs into a flush fitting circular depression (FIG. 5c, 104) which is mounted on the end of the funnel shaft. Alternatively the inlet opening of the separating column can be plugged onto an annular bead (109) attached to the lower end of the funnel.

Figure 2:
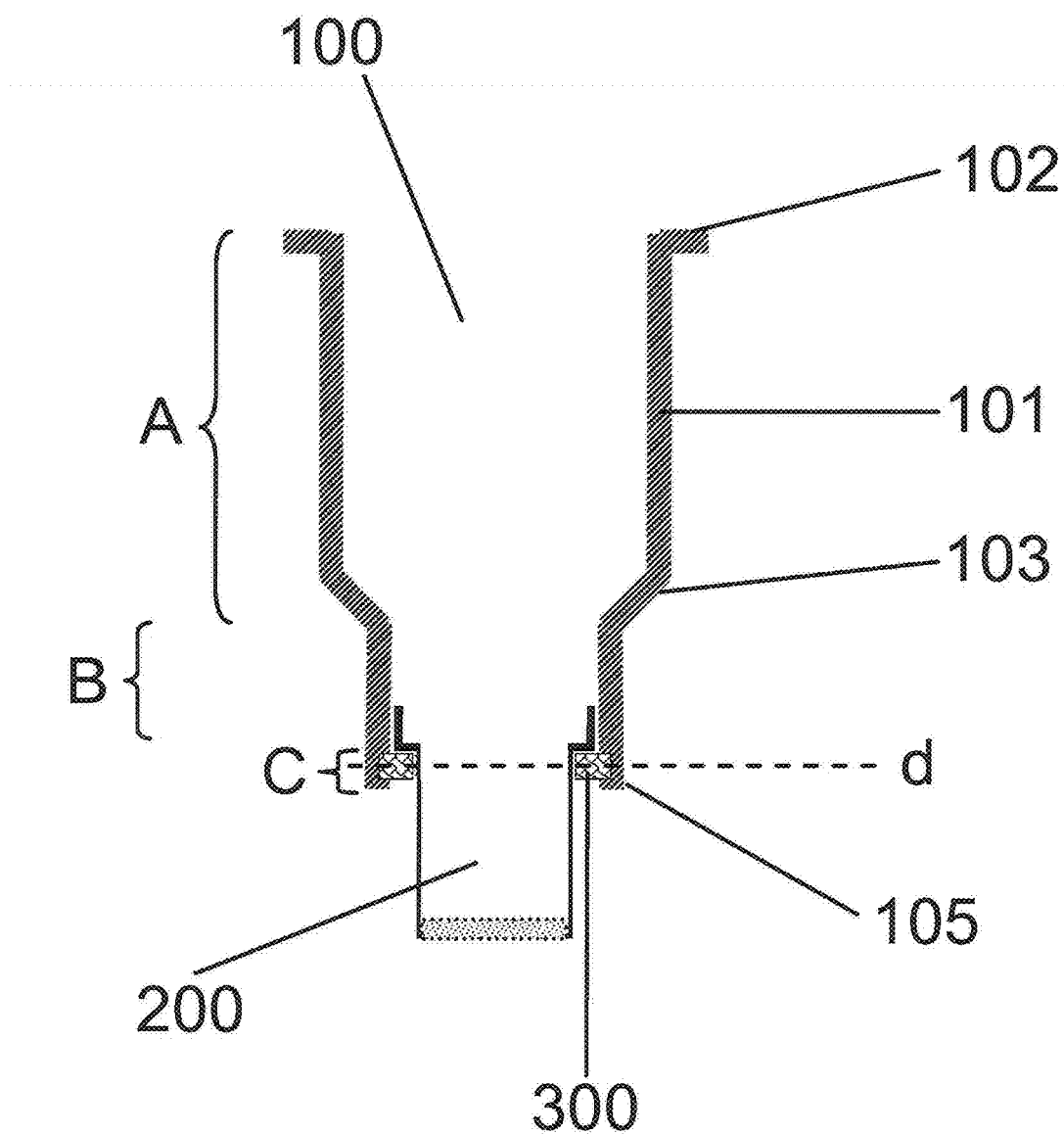
FIG. 2: Schematic representation of the device according to the invention. Conical taper of the funnel (103), annular flange for holding (102) the device in a vessel, holder (105) for the tab (300) at the lower end of the funnel shaft.
Figure 3:
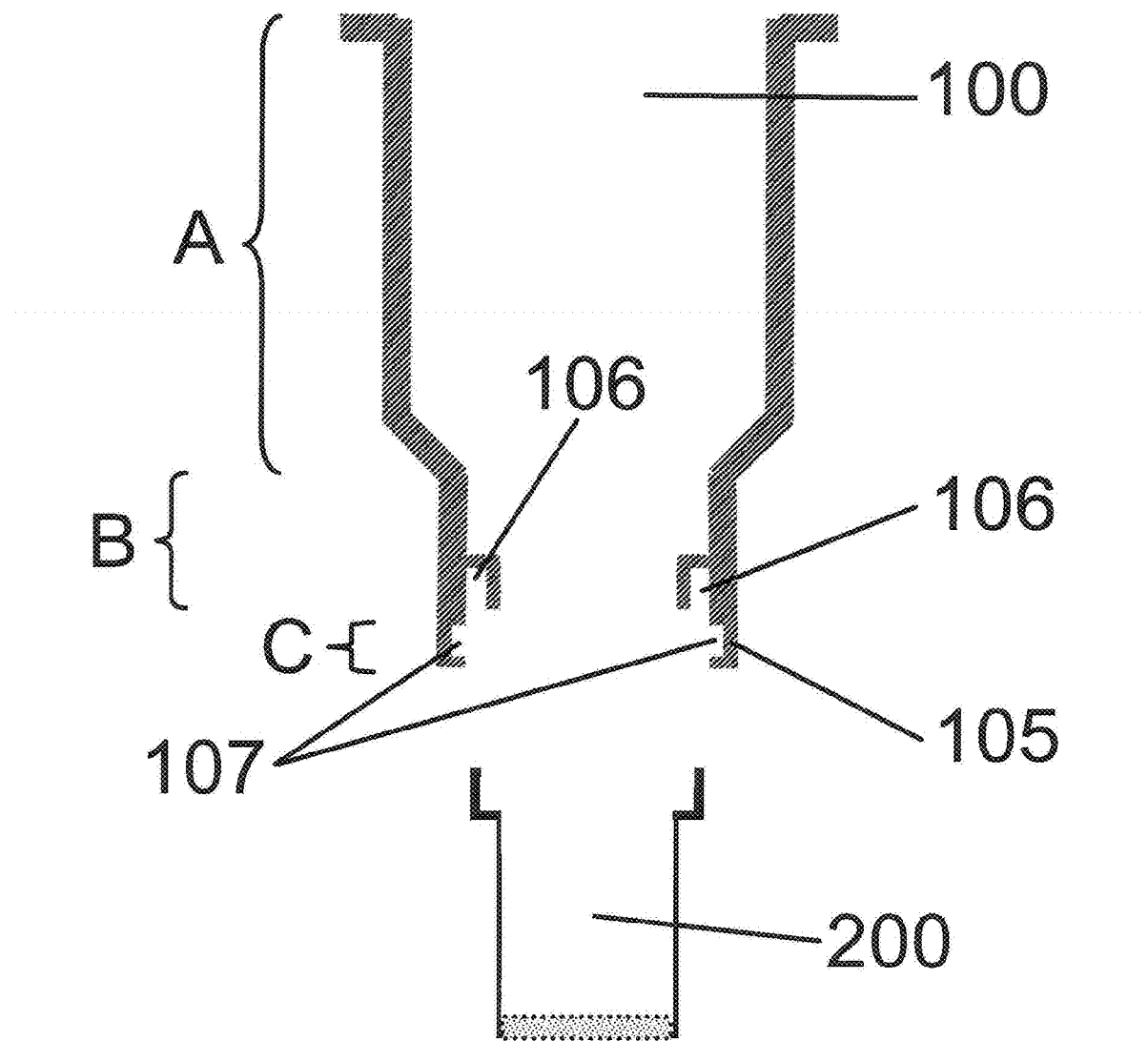
FIG. 3: Schematic representation of the device according to the invention after removing the tab and separating the funnel and separating column. Holding device (105) with grooves (107).

The holder (C; 105) for the tab (300) shown in FIG. 2 and FIG. 5 is adjoined to the lower end of the funnel shaft (B; 108), i.e., the funnel consisting of the elements A, B and C is a component of the device according to the invention that cannot be further disassembled. However, it is possible that during the production of the funnel, firstly a part consisting of the elements A and B is formed and subsequently an element C is attached for example by a welded or adhesive connection or another type of connection which can join A, B and C in such a manner that they cannot be disassembled (when used according to the invention). The element C provides the holder (105). As shown in FIG. 3 the holder can have two opposing grooves (107). FIG. 2 shows how the grooves embrace the outer edges of the tab (300) in (C).

Figure 4B:
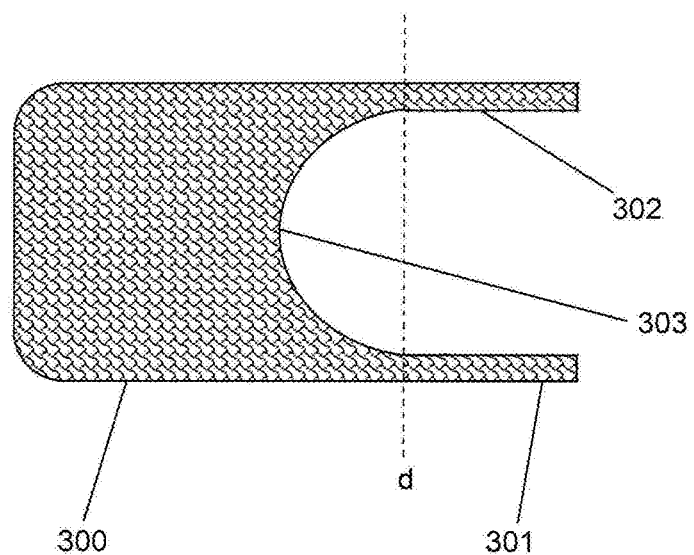

FIG. 4b shows a simple tab (300). It consists of a small plate with a concavity on one side. The concavity has two opposing straight inner edges (302) and a round inner edge (303). The outer edges of the tab are denoted (301). The inner and outer edges delimit the two arms of the tab. In FIG. 2 these arms sit in the grooves. In this connection the inner edge (302, 303) of the tab extends under the annular flange (203, see FIG. 4a) of the separating column. The tab shown in FIG. 4b can be simply removed by pulling it out along the axis of the grooves, because the arrangement is open on one side by the two arms.

Figure 4C:
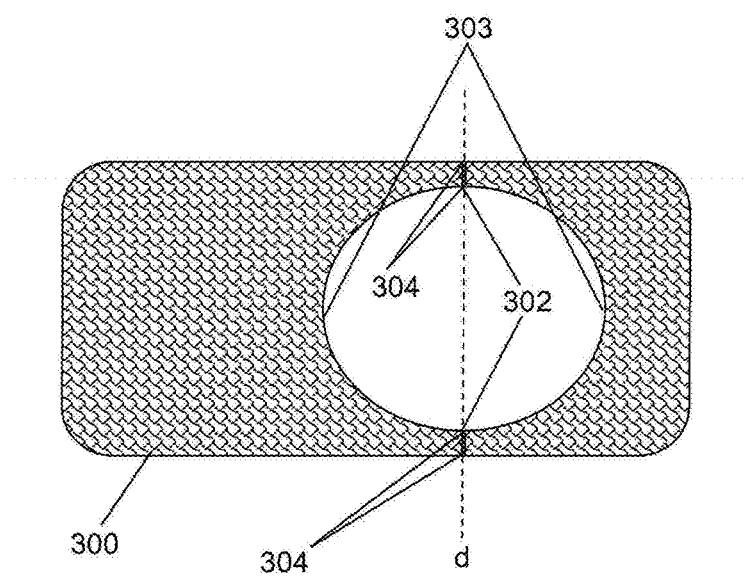

A further very preferred variant is the tab shown in FIG. 4c. It has a circular inner edge (303) and two opposing predetermined breaking points (304). When this tab is used the grooves again enclose the outer edge (301) and the inner edge (303) under the annular flange (203, see FIG. 4a) of the separating column. The arrangement according to FIG. 4b prevents an uncontrolled (or unintentional) sliding out or removal of the tab. The predetermined breaking point can only be broken open by exerting force (pulling) on one end of the tab.

The dashed line labelled (d) in FIGS. 4b and 4c marks the plane which is also drawn in FIG. 2 and FIGS. 5a-c. The line gives the orientation of the tab in the schematic cross-sections (intersection line along the longitudinal axis of the device).

A particular advantage of the arrangement according to the invention is that the separating column can be simply pulled off along the longitudinal axis after the tab has been removed.

This device according to the invention is preferably shaped such that it fits at least partially into a vessel (800). Functionally connected means in this connection that the connection between the funnel and the separating column is designed such that the method according to the present invention can be carried out. For this purpose it should be possible to release the connection as required by removing the tab, the connection should be impermeable to liquids and, for certain applications, it should also prevent air exchange with the environment. In addition it should ensure that the sample passes from the funnel into the separating column without losses. Both hollow bodies are preferably essentially cylinders. The openings are preferably essentially round. In addition to a cylindrical region at the inlet opening, the funnel particularly preferably also has a conical region which becomes narrower towards its outlet opening (see FIG. 2, 103). The funnel preferably has a volume of more than 5 ml. When the sample passes through the outlet opening of the funnel (100), it enters the separating column (200) in a loss-free manner through the preferably round inlet opening by means of the functional connection.

The liquid-permeable, nucleic acid-binding material (204) is located in the separating column. The nucleic acid-binding material is arranged at the preferably round outlet opening (205) of the hollow body in such a manner that the sample liquid that emerges must pass through the nucleic acid-binding material. In this process the nucleic acids are bound (adsorbed) to the nucleic acid-binding material.

The design as well as the material of the separating column can be similar to those of the funnel. In particular the funnel and separating column should be able to receive at least the volume of the sample liquid. The separating column preferably has a smaller volume compared to the funnel. The separating column is preferably shaped such that it fits at least partially into a collecting vessel (700). This collecting vessel is preferably a microliter vessel. In addition the separating column consists of a material that is suitable for centrifugation at high speeds of up to 14,000 revolutions per minute.

The funnel and separating column have means for functionally and reversibly connecting them together. The functional connection of the two hollow bodies is preferably a plug connection as for example shown in FIG. 5a-c. In a preferred embodiment of the present invention the funnel and separating column are connected together by pressing forces such as for example by a plug connection.

The funnel and separating column preferably together have a volume which can accommodate the entire sample and other reagents, e.g., for facilitating the binding of the nucleic acids to the nucleic acid-binding material. The volume is more than 500 microliters, preferably between 1 and 1000 ml and particularly preferably between 1 and 100 ml and most preferably between 5 and 50 ml or 10 and 30 ml. A volume of 10, 20 or 30 ml is particularly preferred.

In addition the funnel preferably has means for holding (102) the device in a vessel (800) in the region near to its inlet opening so that its position is fixed. This vessel has an inlet opening which is preferably round. The vessel preferably has a cylindrical region at the inlet opening and a conical region at its end. The vessel is used to receive the liquid which emerges from the separating column (200) after passage through the nucleic acid-binding material (204). The vessel is preferably closable. A screw cap is particularly preferred for this purpose (900; screw thread 901).

The vessel (800) is preferably shaped and provided with closure means (900) in such a manner that the device according to the invention can be completely accommodated and the vessel (800) can be closed with a closure element (900). The closure element is preferably a screw cap made of plastic. An annular flange is preferred as the means for holding (102) the funnel in the vessel (800) wherein the flange projects beyond the edge of the vessel in such a manner that the funnel rests on it and cannot penetrate further into the vessel. This annular flange is preferably shaped such that it is clamped with the vessel by the closure element (900/902) and thus acts as a seal. In this connection the closure element is preferably a screw cap that is put on from above and the vessel then has the corresponding counter thread.

Alternatively the vessel can have a conical tapered region at its inlet opening such that the funnel cannot penetrate further into the vessel (800) even without additional means for holding it at a defined position. Also in this case the vessel can again be closed with a closure element. It is also conceivable that the device according to the invention only partially fits into the vessel in which case at least the outlet opening of the separating column must completely extend into the vessel.

The separating column (200) is preferably shaped such that it fits at least partially into a collecting vessel (700). This collecting vessel preferably has an essentially round inlet opening. The collecting vessel (700) is preferably closable and consists of a cylindrical region at the inlet opening and a conical region at its end. The collecting vessel is particularly preferably designed such that the separating column (200) provided with holding means (203/202) fits inside and that the vessel can be closed with a closure element. Similarly to the funnel (100), the separating column also preferably has an annular flange as a holding means (203/202) which extends over the edge of the collecting vessel. When a screw cap with a thread is used, the annular flange is clamped with the collecting vessel and acts as a seal. Also in this case a conical shape of the collecting vessel is again conceivable in order to fix the second hollow body at a defined position in which case the hollow body penetrates entirely or at least partially into the collecting vessel.

The funnel, separating column, the vessel or the collecting vessel of the device according to the invention are made of materials that do not bind nucleic acids. The funnel, separating column, the vessel or the collecting vessel of the device according to the invention are preferably made of plastic, ceramic, metal or a composite material. Plastics are particularly preferred such as for example polypropylene, polystyrene, polyethylene, or LURAN (BASF Aktiengesellschaft). These have the advantage of being easy to manufacture in a multi injection-moulding process while at the same time having a high mechanical stability under the conditions of the isolation method according to the invention.

Injection-mouldable plastics are particularly preferred as a material for the separating column (but for practical reasons also for the production of the funnel and tab) because they allow the nucleic acid-binding, liquid-permeable material to be already introduced during the manufacture of the separating column. Especially in the case of glass fibre fleeces, the material can already be permanently poured into the closure element during the injection-moulding process. However, it is also possible to not attach the material until after the separating column has been manufactured in an injection-moulding process, e.g., by gluing, welding or by immobilization with a press ring. Methods for producing separating columns containing nucleic acid-binding material are described in the patent document EP 0738733. Such separating columns containing nucleic acid-binding material are also commercially available (HIGH PURE column from Roche Diagnostics GmbH, Mannheim).

The invention also concerns a closable vessel which contains a device according to the invention. The closable vessel is preferably shaped such that it can hold the entire device according to the invention and can be closed by a closure element. The closable vessel is particularly preferably a commercial centrifugation vessel such as a plastic tube (Falcon tube) which has a filling volume of 50 ml and can be closed by a screw cap.

Another aspect of the present invention is a method for purifying or isolating nucleic acids from a sample comprising the steps:

a) providing a device according to the invention,
b) transferring the sample into the device through the inlet opening in the funnel,
c) passage of the sample from the separating column through the nucleic acid-binding material into a vessel in the process of which the nucleic acids bind to the nucleic acid-binding material,
d) optionally washing the nucleic acids bound to the nucleic acid-binding material,
e) detaching the tab, separating the tab, separating column and funnel and transferring the separating column into a collecting vessel (700),
f) washing the nucleic acids bound to the nucleic acid-binding material,
g) eluting the nucleic acids bound to the nucleic acid-binding material and collecting the nucleic acids in a further collecting vessel (700) which are thus purified or isolated.

A preferred variant of the method of the present invention uses a device according to the invention containing a nucleic acid-binding material that consists mainly of silicon dioxide or silicon dioxide in the form of particles or fibres or that is particularly preferably a glass fleece or silica gel or consists of zeolite and a sample, to which chaotropic reagents are added before it is transferred into the device through the inlet opening of the funnel such that the concentration of chaotropic reagents is between 1 M and 8 M.

A preferred embodiment of the method according to the invention that is based on the device according to the invention is described in the following. Firstly the cells of 5 to 30 ml whole blood, serum, plasma or other body fluids are lysed, disrupted and the additionally required reagents, e.g., a chaotropic salt or/and protease are added to the sample liquid. In addition the device according to the invention is placed in a vessel to collect the nucleic acid-free liquid (arrangement see FIG. 1). After the sample has been transferred into the device through the inlet opening of the funnel, the vessel is preferably tightly closed with a cap.

In the next step the sample liquid is passed through the nucleic acid-binding material. The passage of the sample can, on the one hand, already take place due to the force of gravity or also preferably by centrifuging the device. The passage of the sample through the nucleic acid-binding material can also be effected by applying a pressure difference.

While the sample liquid passes through the nucleic acid-binding material, the nucleic acids present in the sample are bound (adsorbed) to the nucleic acid-binding material whereas other sample components together with the liquid pass over into the vessel. The isolated nucleic acids are now in the nucleic acid-binding material of the separating column which, if required, can be separated from the funnel and processed further as desired.

Since certain quantities of liquid containing impurities usually still adhere to the liquid-permeable material even after centrifugation, it is possible to remove substances that still adhere by an optional washing step before the device is removed from the vessel and the functional connection between the funnel and separating column is separated in order to isolate particularly pure nucleic acids. For this purpose the washing liquid can for example be added through the inlet opening of the funnel thus rinsing the material to which the nucleic acids are bound as it passes through and then collected in the vessel. The washing step can also be carried out by applying a pressure difference or by centrifuging the device.

Figure 6:
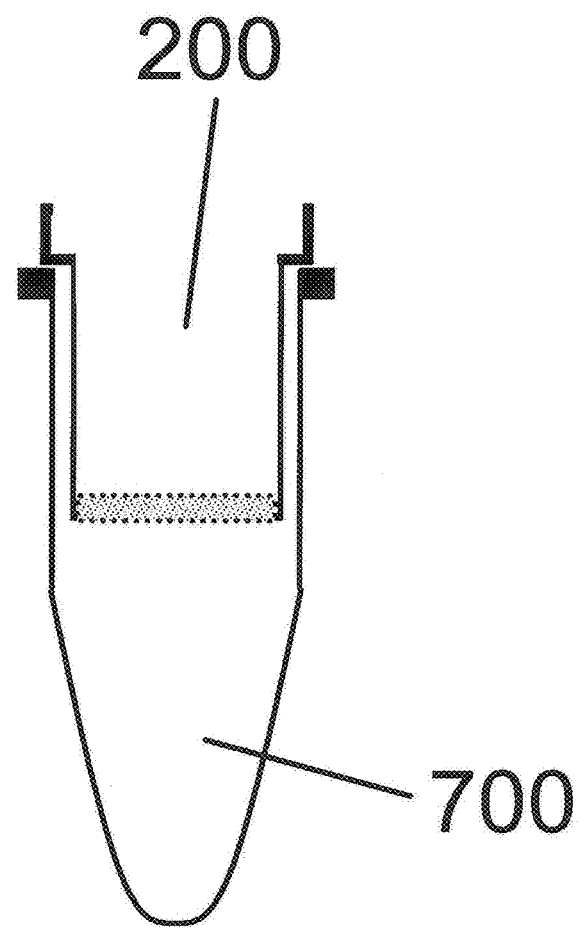
FIG. 6: Schematic representation of the separating column (200) inserted into a collecting vessel (700) which is preferably a microliter vessel.

In order to again detach the nucleic acids from the liquid-permeable, nucleic acid-binding material, the separating column can be removed from the device. This requires firstly that the tab is removed in order to release the separating column. The separating column is preferably connected to a collecting vessel (700) after separation from the funnel in order to firstly remove residual liquid in the fleece. This washing is preferably carried out by centrifuging the collecting vessel (700) with the inserted separating column (200) (see FIG. 6) because the separating column connected to the collecting vessel can be subjected to very high centrifugal forces due to its small dimensions. Subsequently the separating column is connected to a further collecting vessel which should collect the eluate. The composition of the elution liquid is such that the binding of the nucleic acids to the nucleic acid-binding material is abolished. The conditions under which the nucleic acids can be detached again depend on the material that is used and the process can again be alternatively supported by applying a pressure difference or by centrifugation.

The elution is preferably carried out by centrifugation because this enables the nucleic acids to be dissolved in very small volumes of elution liquid and also minimizes the amount of nucleic acids remaining in the nucleic acid-binding material. The centrifugation during elution and during washing is preferably carried out at higher centrifugal forces than the centrifugation during sample passage and optional washing. The centrifugation during elution and during washing is preferably carried out at more than 5000×g and the centrifugation during sample passage and optional washing is preferably carried out at less than 5000×g. The separating column and the collecting vessel are particularly preferably shaped such that they can be centrifuged together for example in an Eppendorf centrifuge (Eppendorf, Hamburg, Germany) at more than 10,000×g. This is possible because the collecting vessel (700) requires a considerably smaller volume than the first vessel (800) that can only be subjected to a considerably lower centrifugal force (for example in a Beckman bench centrifuge, (Beckman Coulter, Inc., USA) at about 3000×g) and would thus require more elution liquid. Thus, the device according to the invention is not only suitable for isolating nucleic acids but also for transferring nucleic acids from a larger into a smaller volume.

Another aspect of the invention is a kit for purifying or isolating nucleic acids from a sample which is composed of a device according to the invention or a vessel according to the invention and chaotropic reagents for binding the nucleic acids to the nucleic acid-binding material. The kit can additionally contain further plastic parts that are necessary to carry out the method according to the invention such as, e.g., microwell plates or simple reaction vessels such as Eppendorf reaction vessels (Eppendorf, Hamburg, Germany). In addition the kit can contain further reagents that are necessary for the method according to the invention, e.g., lysis buffer containing chaotropic reagents, detergents, alcohol or mixtures of these substances which result in the lysis of cells, washing buffer containing chaotropic reagents and/or alcohol for washing the nucleic acid-binding material to which the nucleic acids have been bound or elution buffer which enables the nucleic acids to be detached from the nucleic acid-binding material. These components of the kit can be provided individually or in storage containers according to the invention. The reagents are usually offered ready-to-use but can also be sold in the form of stock solutions which have to be diluted before use.

In addition the present invention concerns the use of a device according to the invention or of a vessel according to the invention for purifying or isolating nucleic acids from a sample.

In detail the invention comprises the following aspects:

1. Device for purifying or isolating nucleic acids consisting of a funnel (100), a separating column (200) and a tab (300), characterized in that the funnel, separating column and tab can be detached from one another, the annular flange (202) of the separating column located at the inlet of the separating column rests flush and tight against the lower end of the shaft (B, 108) of the funnel so that the outlet of the funnel and the inlet of the separating column are functionally connected, wherein the tab supports the annular flange (203) of the separating column in that the inner edge (302, 303) of the tab extends under the annular flange and the outer edges (301) of the flange are held on both sides by a holder (C, 105) at the lower end of the shaft and wherein a nucleic acid-binding material (204) is located in front of the outlet opening (205) of the separating column.

2. Device according to item 1, wherein the separating column has a smaller volume compared to that of the funnel.

3. Device according to one of the items 1 or 2, wherein the device is shaped such that it fits at least partially into a vessel (800).

4. Device according to one of the items 1 to 3, wherein the separating column is shaped such that it fits at least partially into a collecting vessel (700).

5. Device according to one of the items 1 to 4, wherein the funnel and the separating column are connected together by a plug connection.

6. Device according to one of the items 1 to 4, wherein the first and the second hollow body are connected together by press forces.

7. Device according to one of the items 1 to 6, wherein the funnel and/or the separating column are essentially cylinders.

8. Device according to item 7, wherein in addition to its cylindrical region at the inlet opening, the funnel has a conical region that becomes narrower towards its outlet opening.

9. Device according to one of the items 1 to 8, wherein the openings of the funnel and/or separating column are essentially round.

10. Device according to one of the items 1 to 9, characterized in that the funnel has a volume of more than 5 ml.

11. Device according to one of the items 3 to 10, wherein the vessel can be closed.

12. Device according to one of the items 3 to 11, wherein the vessel consists of a cylindrical region at the inlet opening and a conical region at its end.

13. Device according to one of the items 3 to 12, wherein the vessel has means for applying a pressure difference.

14. Device according to one of the items 4 to 13, wherein the collecting vessel can be closed.

15. Device according to one of the items 4 to 14, wherein the collecting vessel can be closed and consists of a cylindrical region at the inlet opening and a conical region at its end.

16. Device according to one of the items 4 to 15, wherein the collecting vessel has means for applying a pressure difference.

17. Device according to one of the items 4 to 16, wherein the inlet openings of the vessel (800) and/or of the collecting vessel (700) are essentially round.

18. Device according to one of the items 1 to 17, characterized in that the nucleic acid-binding material mainly consists of silicon dioxide or contains silicon dioxide in the form of fibres or particles.

19. Device according to one of the items 1 to 18, characterized in that the nucleic acid-binding material is a glass fleece or a silica gel or consists of zeolite.

20. Device according to one of the items 1 to 19, characterized in that the nucleic acid-binding material consists of metal oxides or metal mixed oxides or contains metal oxides or metal mixed oxides in the form of fibres or particles.

21. Device according to one of the items 1 to 20, characterized in that the nucleic acid-binding material consists of aluminium oxide, hafnium oxide or zirconium oxide or contains aluminium oxide, hafnium oxide or zirconium oxide in the form of fibres or particles.

22. Device according to one of the items 1 to 21, characterized in that the funnel or the separating column, the vessel or the collecting vessel are made of a material that does not bind nucleic acids.

23. Device according to one of the items 1 to 22, characterized in that the funnel, the tab or the separating column, the vessel or the collecting vessel are made of plastic, ceramic, metal or a composite material.

24. Device according to item 23, characterized in that the separating column is made of polypropylene.

25. Closable vessel (800) which contains a device according to one of the items 1 to 24.

26. Method for purifying or isolating nucleic acids from a sample by
   a) providing a device according to one of the items 1 to 25,
   b) transferring the sample into the device through the inlet opening in the funnel,
   c) passing the sample from the separating column through the nucleic acid-binding material into a vessel in the process of which the nucleic acids bind to the nucleic acid-binding material,
   d) optionally washing the nucleic acids bound to the nucleic acid-binding material,
   e) detaching the tab, separating the tab, separating column and funnel and transferring the separating column into a collecting vessel (700),
   f) washing the nucleic acids bound to the nucleic acid-binding material,
   g) eluting the nucleic acids bound to the nucleic acid-binding material and collecting the nucleic acids in a further collecting vessel (700) which are thus purified or isolated.

27. Method according to item 26, characterized in that a device according to one of the items 18 or 19 is used and that chaotropic reagents are additionally added to the sample before it is transferred into the device through the inlet opening in the funnel such that the concentration of the chaotropic reagents is between 1 M and 8 M.

28. Method according to item 26, characterized in that the passage of the sample in step d), the optional washing in step e), the washing in step g) or the elution in step h) are effected by applying a pressure difference.

29. Method according to item 26, characterized in that the passage of the sample in step d), the optional washing in step e), the washing in step g) or the elution in step h) are effected by centrifugation.

30. Method according to item 29, characterized in that the centrifugation in steps g) and h) is carried out at a higher centrifugal force compared to the centrifugation in steps d) and e).

31. Method according to item 29, characterized in that the centrifugation in steps d) and e) is carried out at a centrifugal force of less than 5000×g.

32. Method according to item 29, characterized in that the centrifugation in steps g) and h) is carried out at a centrifugal force of more than 5000×g.

33. Kit for purifying or isolating nucleic acids from a sample which is composed of
   a) a device according to one of the items 1 to 24 or a vessel according to item 25,
   b) chaotropic reagents for binding the nucleic acids to the nucleic acid-binding material.

34. Use of a device according to one of the items 1 to 24 or of a vessel according to item 25 to purify or isolate nucleic acids from a sample.

The invention is further elucidated by the following examples, publications and figures the protective scope of which results from the patent claims. The described methods are to be understood as examples which still describe the subject matter of the invention even after modifications.

Example 1

Figure 7A:
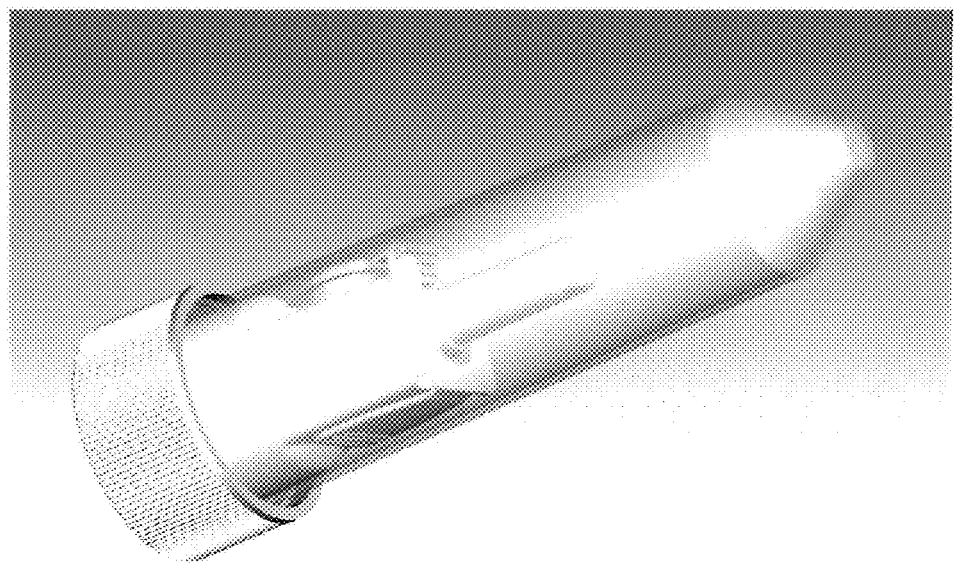
FIG. 7a: Particularly preferred embodiment of the device according to the invention in a vessel.
Figure 7B:
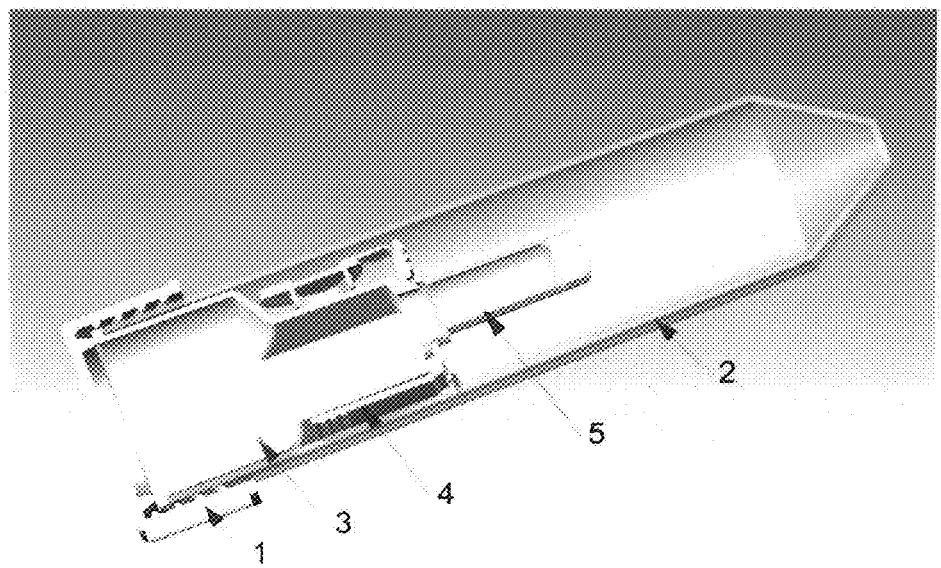
FIG. 7b: Longitudinal section through the object shown in FIG. 7a. (1) Cap of the screw vessel (2). Funnel (3) with asymmetrically shaped shaft in order to leave space for a bent tab (4) and the cap attached by a hinge to the separating column (5).
Figure 8A:
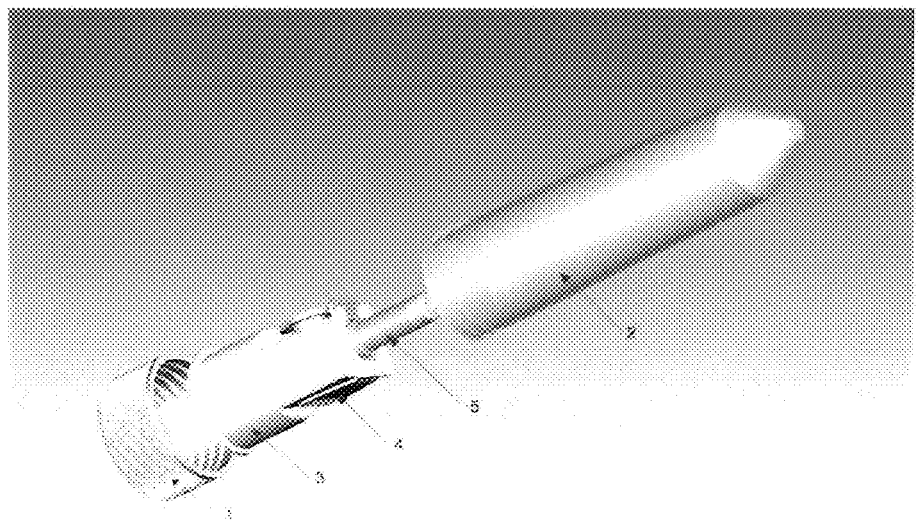
FIG. 8a: Diagram of the screwed-on vessel (2) and the undismantled device according to the invention consisting of a funnel (3), tab (4) and separating column (5).
Figure 8B:
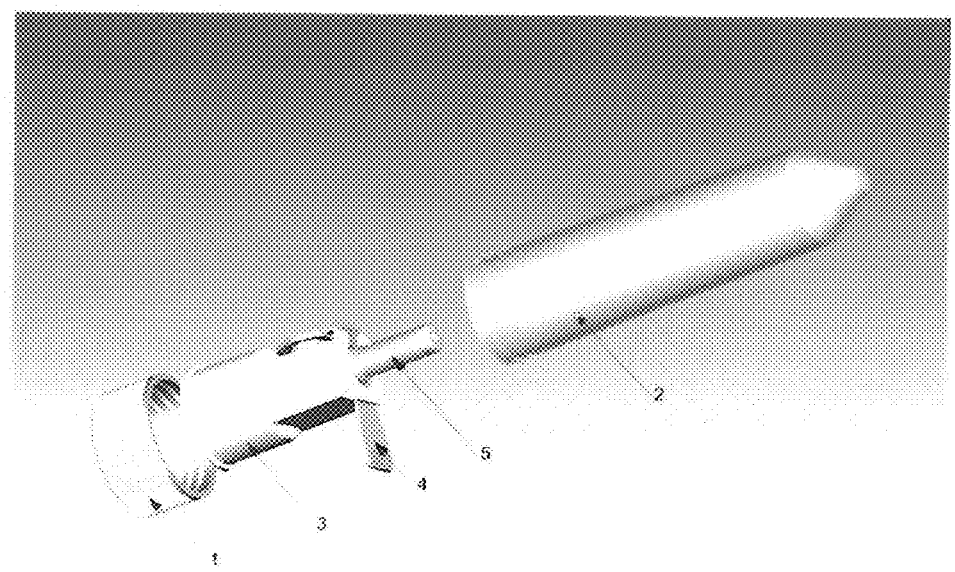
FIG. 8b: As FIG. 8a, but with the tab lifted up.
Figure 9A:
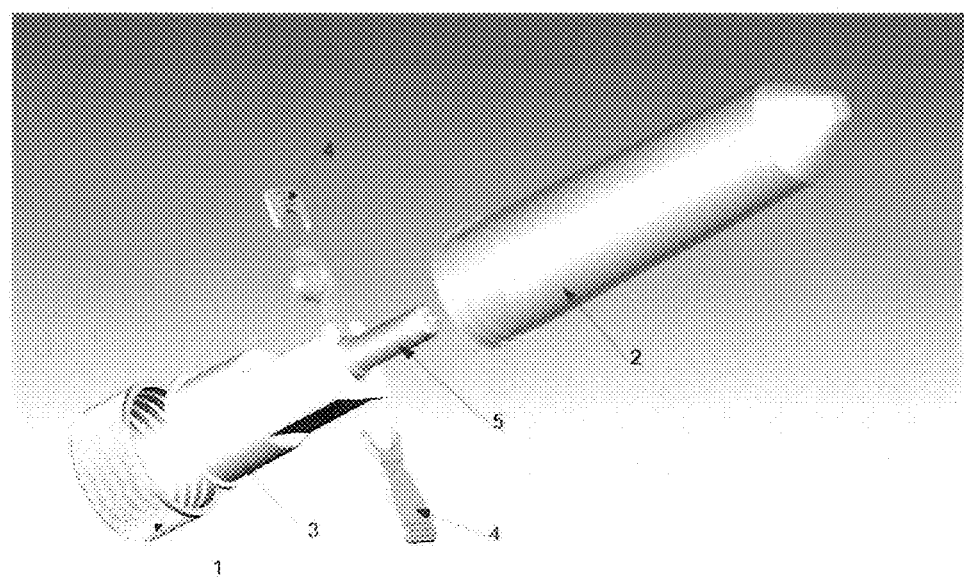
FIG. 9a: Diagram of the tab broken at the predetermined breaking point which was removed from the device according to the invention.
Figure 9B:
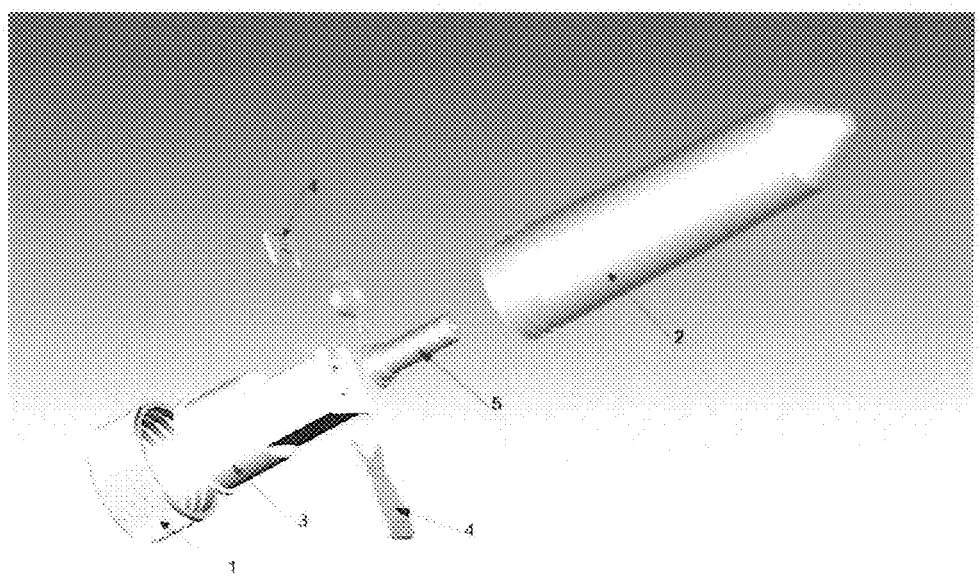
FIG. 9b: As FIG. 9a, but with a separating column pulled from the funnel shaft in the longitudinal direction.
Figure 10:
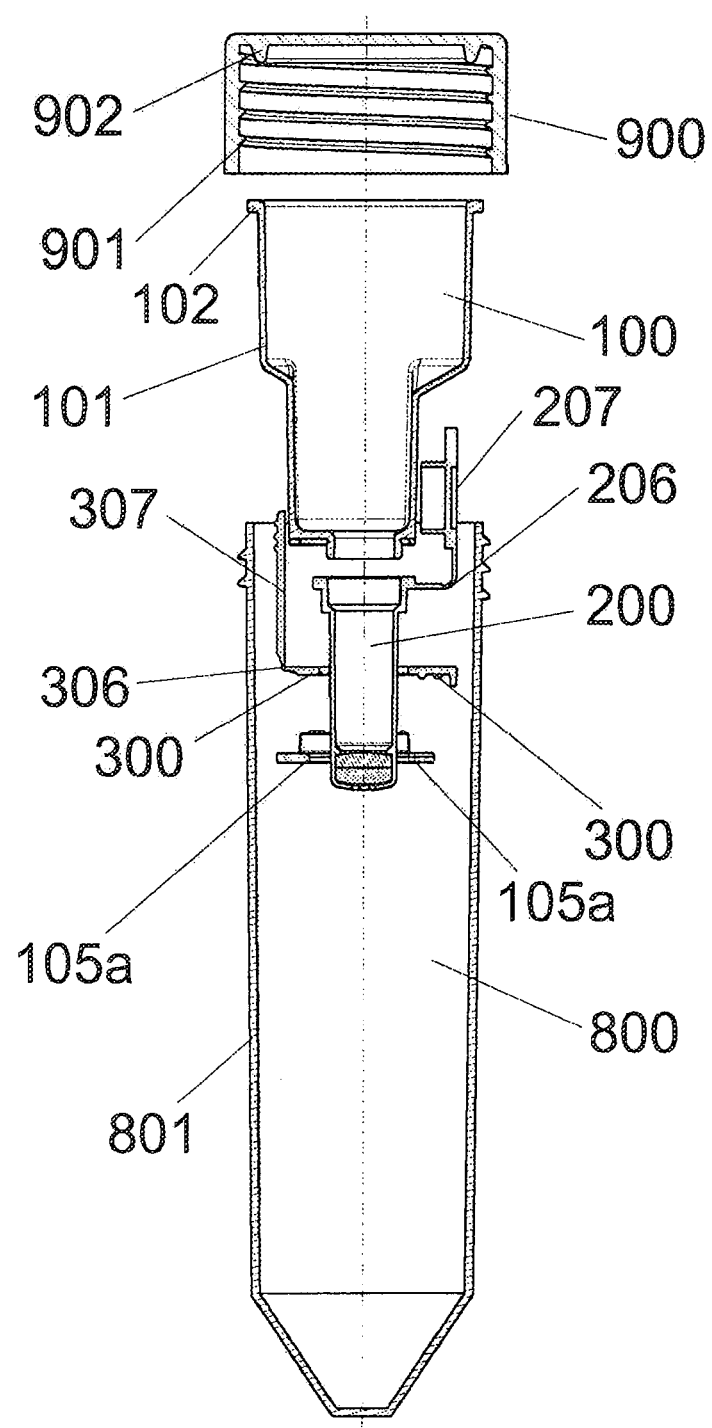
FIG. 10: Particularly preferred embodiment of the device according to the invention in a vessel analogous to FIG. 7b. In contrast to FIG. 7b, some elements are shown here pulled apart for a better overview. The elements comprise the cap of the screw vessel (900), the funnel (100) with an asymmetrically shaped shaft, the vessel (800), the separating column (200) with a closure cap (207) bent at a joint (206), the tab (300) with a grip (307) bent at a joint (306) and the holding device for the tab (105a). The latter is shown separate (in the longitudinal direction) from the funnel. Further captions are analogous to FIG. 1 and FIG. 2.
Figure 11:
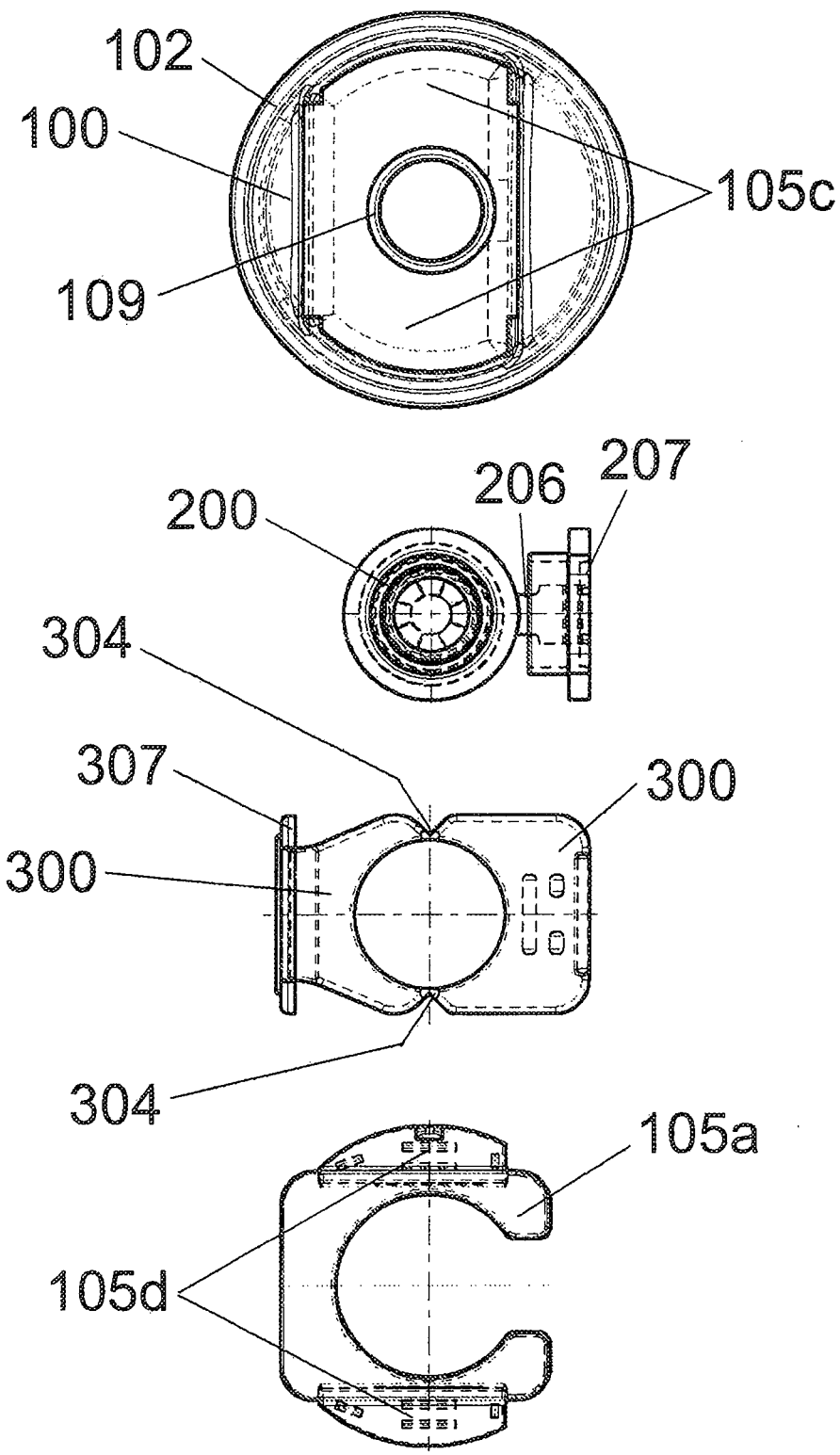
FIG. 11: Elements of the particularly preferred embodiment of the device shown in FIG. 10 (top-view): funnel (100), separating column (200), tab (300) and holding device for the tab (105a). There is a slip-on bead around the lower end of the funnel to make a plug connection where the outer diameter of the slip-on bead is designed such that the (upper) inlet opening of the separating column can be plugged thereon in a flush manner. Predetermined breaking point (304), tab grip (307). When the holding device (105a) is joined to the funnel, the areas labelled with (105d) are joined to the areas (105c) on the underside of the funnel. This connection is preferably a welded or glued joint.
Figure 12:
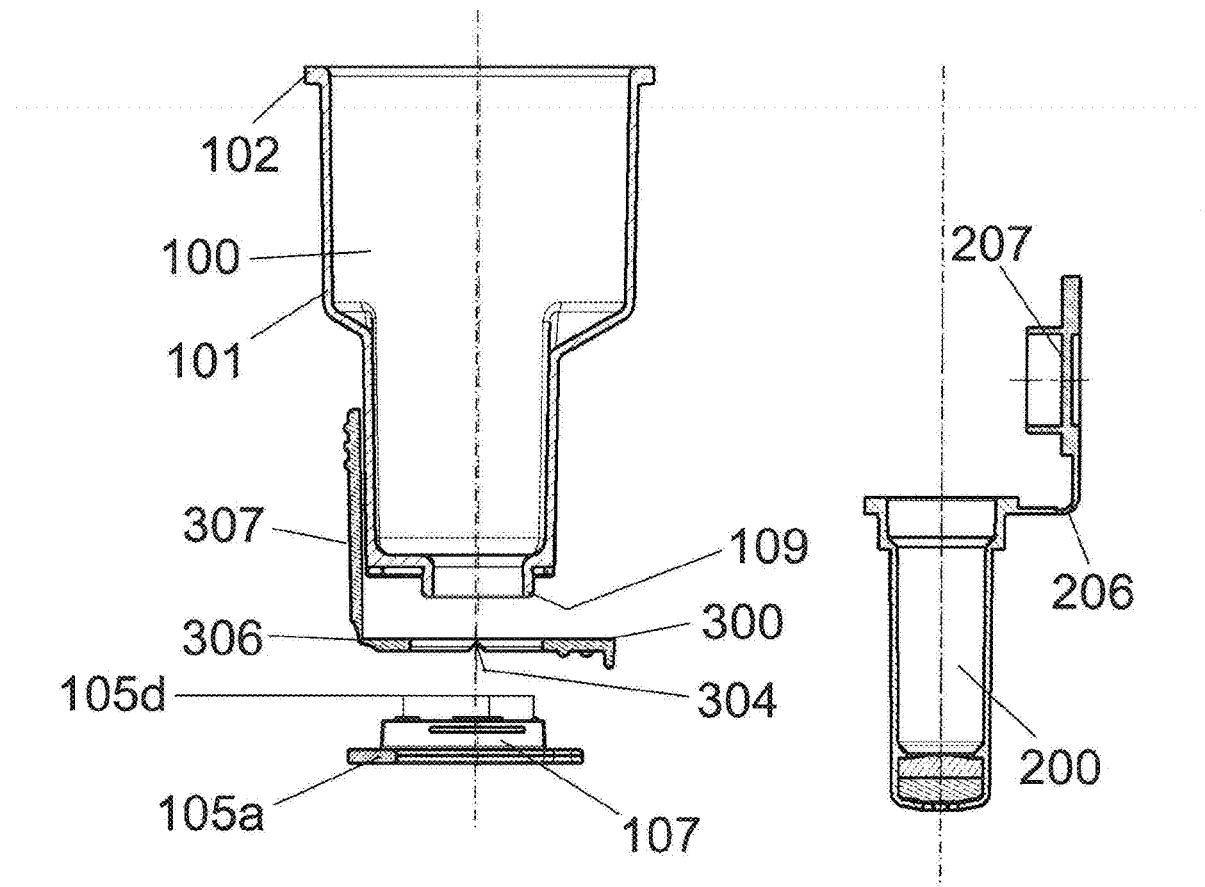
FIG. 12: Elements of the particularly preferred embodiment of the device shown in FIG. 10 (first side-view): Captions are as in the previous figures. (107) refers to a groove as in FIG. 4 which in the assembled state has contact with an outer edge of the tab (300).
Figure 13:
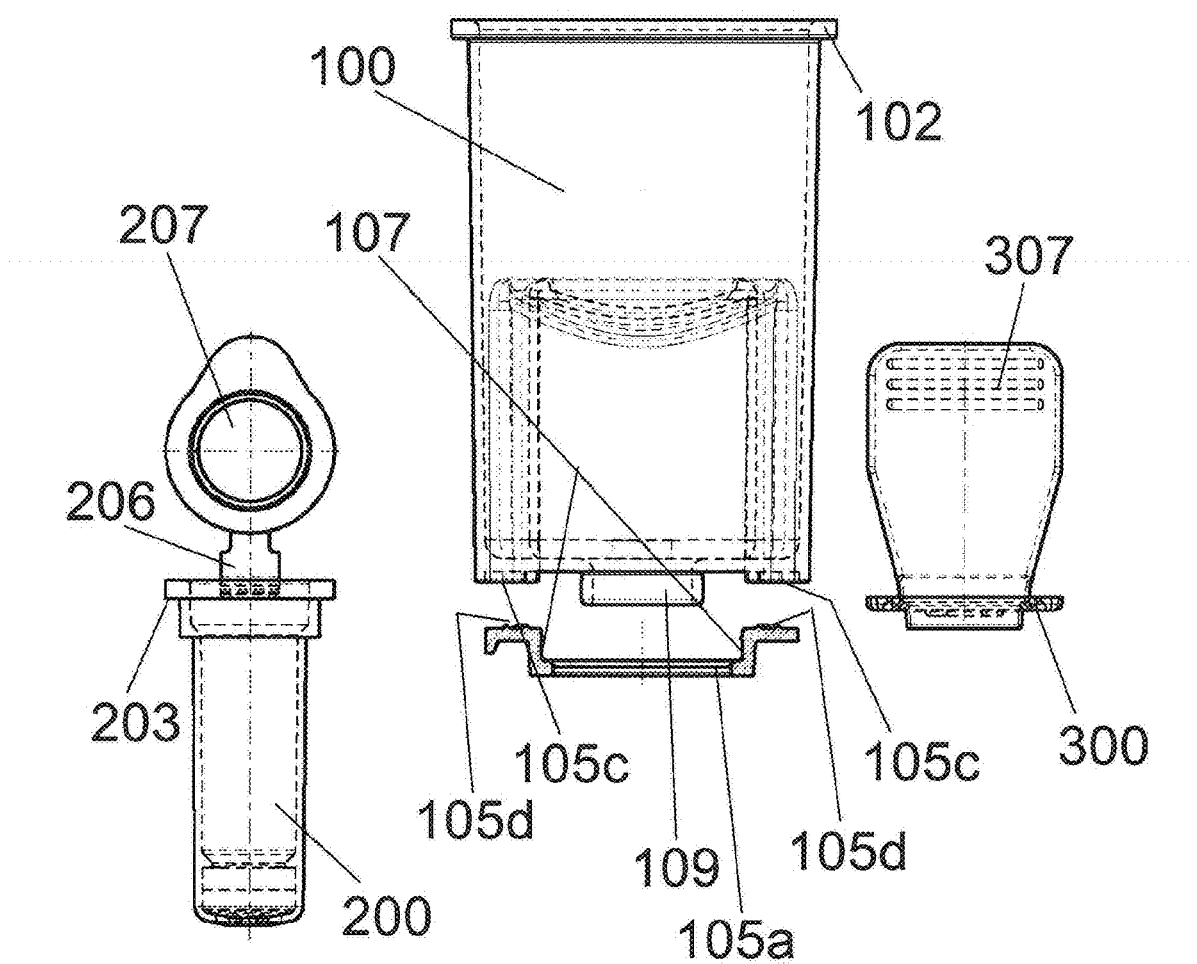
FIG. 13: Elements of the particularly preferred embodiment of the device shown in FIG. 10 (second side-view): Captions are as in the previous figures.

The following example of a DNA isolation from 5 ml serum is intended to further illustrate the invention. The method uses a "HIGH PURE Extender"-device which contains a commercially available separating column HIGH PURE column (Roche Diagnostics GmbH, Mannheim, Germany) and is connected to a plugged on volume attachment (funnel). The separating column is secured against accidentally sliding off the funnel shaft by a tab. Reagents were used which are identical to the reagents of the "MAGNA PURE LC Total Nucleic Acid Isolation Kit-Large Volume" (Roche Diagnostics GmbH, Mannheim, Germany). In this example the funnel (made of polypropylene) has a cylindrical shape in the upper part (inner diameter 2.6 cm, length 2 cm). The lower part of the funnel is asymmetrically constricted in order to provide space for a part of the tab and the cap that is attached to the separating column by means of a joint (shown in FIGS. 7-9). The funnel has a filling volume of about 17.5 ml, a round inlet opening and an outlet opening, in which a HIGH PURE column (volume about 1.5 ml) is attached and secured by means of a tab. In the DNA isolation procedure an Eppendorf centrifuge (Eppendorf, Hamburg, Germany), a Beckman centrifuge (Beckman Coulter, Inc., USA) with 50 ml Falcon tubes, a commercial vortexer and Eppendorf reaction vessels (Eppendorf, Hamburg, Germany) are also used.

Procedure for DNA Isolation

250 µl of a 40 mg/ml proteinase K solution is placed in a 50 ml Falcon tube. 5 ml sample (serum or plasma) is added to this, vortexed and then incubated for 10 min at room temperature. In the next step 6.25 ml lysis/binding buffer is added, vortexed and the solution is incubated for 10 min at 70° C. Subsequently it is centrifuged at 1900×g (removal of foam). 3.125 ml isopropanol is added next, mixed and centrifuged for 1 min at 1900×g, then the mixture is allowed to stand for 10 min at room temperature. In the next step the mixture is introduced in one portion (about 15 ml) into the volume attachment of the device, the remaining residual liquid is also added to the column using a pipette. It is firstly centrifuged for 2 min at 1900×g (including acceleration) and afterwards for 1 min at 3300×g. In the next step the flow-through is discarded.

This is then followed by various washing steps (the washing buffers that are used are contained in the commercially available "MAGNA PURE LC Total Nucleic Acid Isolation Kit-Large Volume", Cat. No. 3264793, Roche Diagnostics GmbH, Mannheim, Germany): Firstly the device is placed in a new 50 ml Falcon tube, 2 ml washing buffer 1 is added and it is centrifuged for 2 min at 3300×g. Afterwards 2 ml washing buffer 2 is added and it is centrifuged for 2 min at 3300×g. In the next washing step 2 ml washing buffer 3 is added and it is centrifuged for 2 min at 3300×g (the 3 washing steps can be carried out without changing the Falcon tube).

The volume attachment is now removed from the HIGH PURE column (Roche Diagnostics Operations, Inc., see FIGS. 8 and 9) and the HIGH PURE column is placed in an Eppendorf vessel (microliter vessel) (see FIG. 6), closed with a cap and centrifuged in an Eppendorf centrifuge for 1 min at 20,000×g. This removes the residual liquid from the fleece.

The next step comprises the elution of the DNA. 50-100 µl elution buffer is added to the fleece and the HIGH PURE column is closed with a cap. Afterwards it is incubated for 3 min at room temperature and subsequently centrifuged for 1 min at 20,000×g in an Eppendorf centrifuge. The Eppendorf reaction vessel contains the eluate and the HIGH PURE column can be discarded.

Example 2

The following example shows a comparison of a DNA isolation according to the method of the invention and an isolation according to the prior art. A serum sample was prepared analogously to example 1 and divided equally onto 2 HIGH PURE columns with a volume attachment. The experimental procedure for both columns is identical up to the step of removing residual liquid. In the case of one of the columns the volume attachment is separated in the following from the HIGH PURE column according to the invention, the residual liquid in the fleece is removed by centrifugation with the aid of an Eppendorf centrifuge (about 15 µl) and the bound nucleic acid is subsequently eluted in 50 µl again with the aid of an Eppendorf centrifuge.

In contrast, in the case of the second column the connection between the HIGH PURE column and the volume attachment is retained, the entire device is inserted into a Falcon tube and the elution with 50 µl solution is carried out in a Beckman centrifuge (2 min at 3300×g) without previously removing the residual liquid from the fleece.

The result shows that on average in over 10 experiments the DNA yield without separating the device and without the Eppendorf centrifuge was about 30% lower.

What is claimed is:

1. A device for purifying or isolating nucleic acids comprising:
   a funnel, the funnel comprising an upper part comprising an annular flange which projects outwards and surrounds an inlet opening at its upper end, the flange for holding the device in a vessel, the upper part tapering toward a shaft having an outlet opening and a holder having two opposing grooves at its lower end,
   a separating column the separating column comprising an inlet opening at its upper end, an outlet opening at its lower end, and an annular flange at its upper end for holding the column flush and tight against the lower end of the funnel whereby the outlet of the funnel and the inlet of the separating column are functionally connected, wherein the annular flange of the separating column is held by the holder, and wherein a nucleic acid binding material is located in front of the outlet opening of the separating column, and
   a tab consisting of a small plate with two opposing arms that can sit in the holder extending in the holder grooves oriented at a cross-section to a longitudinal axis of the device and having a side opening such that the tab can be removed by pulling the tab along an axis of the grooves of the holder, wherein the tab has an inner edge extending under and supporting the annular flange of the separating column, wherein the separating column is secured against sliding off the funnel shaft by the tab, and
   wherein the funnel, separating column, and tab are detachable from each other.

2. The device according to claim 1 wherein the device is shaped such that it fits at least partially into a vessel.

3. The device according to claim 1 wherein the funnel and the separating column are connected together by press forces.

4. The device according to claim 1 wherein the nucleic acid-binding material comprises silicon dioxide or contains silicon dioxide in the form of fibers or particles.

5. A closable vessel which contains a device according to claim 1.

6. A method of purifying or isolating nucleic acids from a sample comprising the steps of:
   providing a device according to claim 1 and a sample containing the nucleic acids,
   transferring the sample to the device via the inlet opening in the funnel,
   passing the sample from the separating column through the nucleic acid-binding material into a vessel, whereby the nucleic acids in the sample bind to the nucleic acid-binding material,
   optionally washing the nucleic acids bound to the nucleic acid-binding material,
   detaching the tab, separating the tab, separating column and funnel, and transferring the separating column into a collecting vessel, washing the nucleic acids bound to the nucleic acid-binding material, and eluting the nucleic acids bound to the nucleic acid-binding material and collecting the nucleic acids in a further collecting vessel, thereby purifying and isolating the nucleic acids.

7. A method for purifying or isolating a nucleic acid from a sample comprising the steps of:

providing a device according to claim 4 and a sample containing the nucleic acids and a chaotropic reagent in a concentration of between 1 M and 8 M, transferring the sample to the device via the inlet opening in the funnel, passing the sample from the separating column through the nucleic acid-binding material into a vessel, whereby the nucleic acids in the sample bind to the nucleic acid-binding material, optionally washing the nucleic acids bound to the nucleic acid-binding material, detaching the tab, separating the tab, separating column and funnel, and transferring the separating column into a collecting vessel, washing the nucleic acids bound to the nucleic acid-binding material, and eluting the nucleic acids bound to the nucleic acid-binding material and collecting the nucleic acids in a further collecting vessel, thereby purifying and isolating the nucleic acids.

8. A kit for purifying or isolating nucleic acids from a sample comprising a device according to claim 1 and chaotropic reagents for binding the nucleic acids to the nucleic acid-binding material.

9. A kit for purifying or isolating nucleic acids from a sample comprising a vessel according to claim 5 and chaotropic reagents for binding the nucleic acids to the nucleic acid-binding material.

10. The device of claim 1 wherein the tab is designed as a plate with a concavity on one side.

11. The device of claim 1, wherein the tab has at least one predetermined breaking point that prevents at least one of: an uncontrolled sliding out of the tab, and uncontrolled removal of the tab.

12. The device of claim 11 wherein the separating column can be detached after the tab has been removed by breaking the at least one predetermined breaking point.

* * * * *